Figure 1:
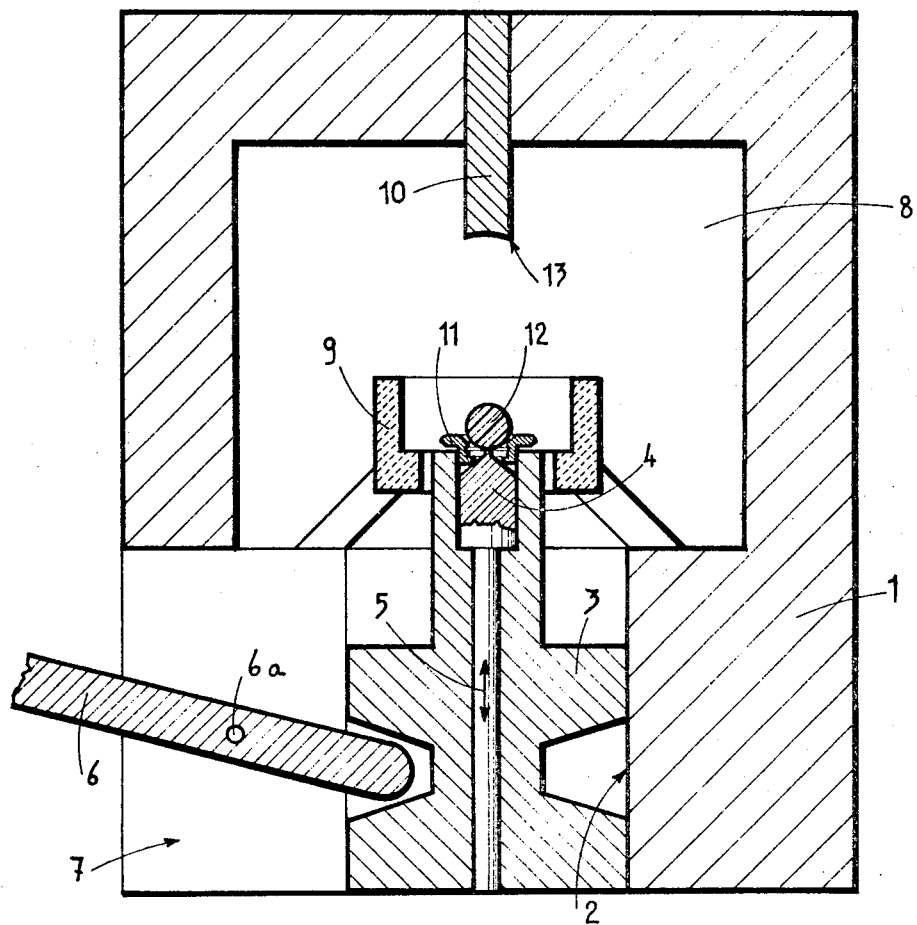

United States Patent
Kurucz et al.

[15] 3,685,935
[45] Aug. 22, 1972

[54] APPARATUS FOR MANUFACTURING BEARINGS THAT ARE TO BE USED PARTICULARLY IN THE WATCHMAKING INDUSTRY AND FOR SMALL APPARATUSES

[72] Inventors: Janos Kurucz, Rte. Neuve 21, Orient, Vaud; Andre Matthey, Les Jeannerets 33, Le Locle, Neuchatel, both of Switzerland

[22] Filed: March 3, 1971

[21] Appl. No.: 120,646

[30] Foreign Application Priority Data

Mar. 10, 1970 Switzerland ............. 3453/70
Sept. 29, 1970 Switzerland............. 14526/70

[52] U.S. Cl. ............... 425/116, 425/117, 425/125, 425/128, 425/408, 264/268
[51] Int. Cl. ............................ B29c 3/00, B29c 6/00
[58] Field of Search......425/116, 117, 125, 128, 406, 425/408

[56] References Cited

UNITED STATES PATENTS

| | | | |
|---|---|---|---|
| 569,969 | 10/1896 | Kempshall | 425/129 |
| 2,304,190 | 12/1942 | Milner | 425/408 |
| 2,559,861 | 7/1951 | Kay | 425/125 |
| 3,189,947 | 6/1965 | Pettkoske | 425/128 |
| 3,257,709 | 6/1966 | Fernan et al. | 425/116 X |

*Primary Examiner*—J. Howard Flint, Jr.
*Attorney*—Kenwood Ross and Chester E. Flavin

[57] ABSTRACT

A thermoplastic bearing and method of making same for use particularly in the watchmaking industry and for small apparatuses wherein the bearing body is installed on the tip of an axially movable punch with the punch penetrating slightly into the inside of the body, and a piece of thermoplastic material is placed on the body which body and material are then heated until the material softens whereupon the punch together with the bearing body and thermoplastic material are moved axially toward a second punch placed coaxially and upside down with respect to the first punch so as to allow the piece of thermoplastic material to leave the heating zone just before molding, and the material between the two punches is then squeezed, the material being cooled instantaneously by contact with the second punch during molding.

8 Claims, 2 Drawing Figures

INVENTORS.
Janos KURUCZ
André MATTHEY
BY Kenwood Ross &
Chester E. Flavin
ATTORNEYS.

APPARATUS FOR MANUFACTURING BEARINGS THAT ARE TO BE USED PARTICULARLY IN THE WATCHMAKING INDUSTRY AND FOR SMALL APPARATUSES

The present invention relates to apparatus for manufacturing bearings that are to be used particularly in the watchmaking industry and for small apparatuses. These bearings are made of a thermoplastic material directly moulded into the supporting body of the bearing.

The process comprises installing the bearing body on the tip of an axially movable punch, said punch penetrating slightly into the inside of said body, placing a piece of thermoplastic material on the body, heating body and material together until the material softens, moving said punch together with said bearing body and thermoplastic material axially toward a second punch placed coaxially and upside down with respect to the first punch, and moving allowing the piece of thermoplastic material to leave the heating zone just before moulding, and squeezing and crushing said material between the two punches, the material being cooled instantaneously be contact with the second punch during moulding.

This device comprises a movable punch on the tip of which is placed a bearing body, heating means acting on said bearing when installed over the punch tip and on a piece of thermoplastic material placed upon said bearing body, and a second punch, facing the first punch, located coaxially with respect to it outside of the heating zone of the heating means, constructed in such a way that the heated bearing body with its thermoplastic material is moved by simultaneously in the displacement of the first punch so that it leaves the heated zone, contacts the second punch so that the thermoplastic material is squeezed and moulded between the two punches and at the same time forced into the inside of the bearing body.

The invention is illustrated by the following example and the accompanying drawings.

Figure 2:
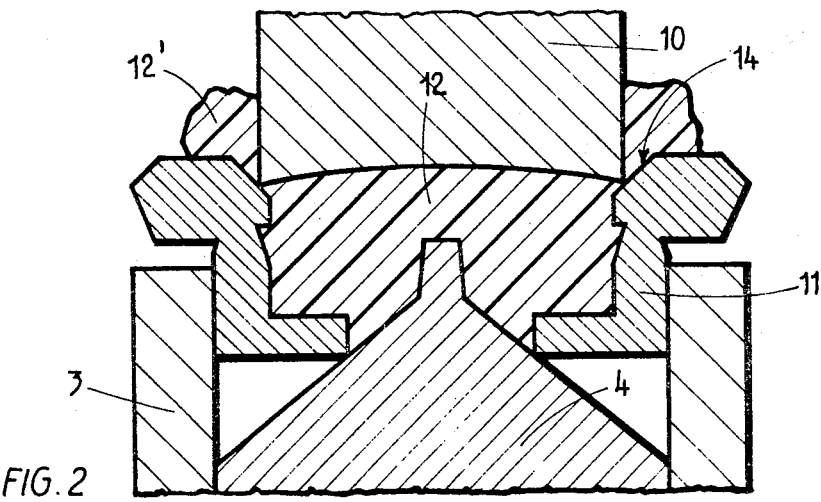

FIG. 1 is an axial sectional view of a device for manufacturing bearings for the watchmaking industry, and, FIG. 2 is another magnified sectional view of a part of the same device showing the phase of moulding.

The device, pictured schematically, comprises a frame structure boring having at the base a bearing and a movable punch-bearer 3 therein. A pointed punch is attached to the upper end of the punch bearer 3, the displacements of which are driven, in the direction of the arrow 5, by a master lever 6 located in a radial spacing 7 of the frame 1, and which is hinged to 6a.

There is a hollow spacing 8 in the upper part of the frame 1, containing an annular stationary heating body 9 which acts essentially at a level corresponding to the top of the punch 4 when the punch 4 is in its lower starting position as shown in FIG. 1.

The frame carries a second punch 10, unmovable, located coaxially to and facing punch 4.

The above device operates as follows:

An annular bearing-body 11 is installed on the tip of the punch 4; when punch 4 is in its lower position (FIG. 1), the bearing-body engages slightly into the boring of the punch bearer 3 which accommodates the punch 4. A piece of thermoplastic material 12, preferably self-lubricating, is placed over the bearing-body 11 and both of these elements, 11 and 12, are heated together with the heater, or oven 9.

The heating temperature should be about 30° to 40° C less then the melting point of the thermoplastic material. It is therefore preferable that the heater be regulated in such a manner that the heating temperature does not go beyond the temperature at which the plastic simply softens, even if the punch 4 stays in its initial position longer then necessary. Therefore, the heating time is not critical and the working rate needs not be predetermined.

Because of internal cohesion force, the plastic material does not flow when heated at the right temperature but acquires the shape of a small shiny sphere which remains so, as long as the heating temperature is constant. This change is visible and informs the operator of the moment at which he should operate master lever 6 which moves up the carrier 3, the punch 4, the bearing body 11 and the plastic 12 is in the direction of the punch 10.

While being moved, the body 11 and the plastic 12 leave the heating zone of the over 9, which acts by radiation, the heating of which becomes inoperative on the plastic at the very moment when it should stop, that is to say at the start of the phase of moulding and shaping of the thermoplastic material, without any effect of inertia.

Just before the carrier 3 reaches the end of the stroke, the plastic 12 meets the front side of the stationary punch 10; it is then squeezed and squashed between the two punches and simultaneously force shaped into the body 11.

While this shaping operation is performed, the plastic is cooled instantaneously by contact with punch 10; so it may be advantageous to choose for punch 10 a material having a thermal conductivity suited for this purpose.

The cooling rate of the plastic during moulding and the moulding pressure are critical for obtaining, on the surface of the bushing 12 and particularly the surfaces forming the central hold thereof shaped by the tip of the punch 4, a film having a harder structure than the rest of the material.

This film results from the cooling of the "skin which exists around the molten plastic when the plastic is softened to give the shiny ball described above. The "skin" constitutes a "bag" which is simply shaped by punch 10; the "skin" is ruptured by the ring shaped edge 13 born by the front face of punch 10, only at the moment when this edge contacts a flanged opening 14 in the inside of bearing-body 11.

However already then, the coding effect produces a hardening of the "skin" which results in the formation of the hard surface film mentioned above which film imparts to the bushing 12 good shock absorbing properties.

Effectively, the structure of the material of the bushing is not hard enough to prevent it from responding elastically against the action of a side stress resulting from the operational presence of the bearing shaft. However, the surface film is hard enough not to be damaged by impacts from said shaft.

It should be noticed that the annular plastic residue 12', which is cut off from the material 12 by the ring edge 13 of the punch 10, remains around punch 10 when punch 4 withdraws, wherefrom this residue 12' can be easily brushed off.

The work-up of the present process may involve some problems resulting mainly from variations in softening and melting points of different plastics and due to the fact that these temperatures must be carefully controlled during work-up.

For instance it has been noticed that the cooling conditions have to be accurately controlled, and modified when one sort of plastic is replaced by another one, otherwise the crystallization of the plastic is incomplete and the finished product is unsatisfactory its properties changing with age.

The above difficulties are removed by using the following modification of the invention:

The fixed punch comprised in the device of the above mentioned embodiment is provided with a heating attachment to keep it at constant temperature during work-up, to prevent said punch from being at an improper temperature when it contacts the molten plastic. The ratio between the temperature of the lower punch with the bearing-body and that of the upper punch can then be optimalized with regard to the thermoplastic material chosen.

The heating attachment to heat the upper punch can be ring-shaped to surround the punch and have an independent electric source. The temperature control can be obtained either by varying the supply voltage, or by an axial displacement of the heating element along the punch, or by modifying its diameter, i. e. its distance to the punch. Evidently the same control means can be applied to the lower punch which permits a fine setting of temperature ratios.

The heater of the lower punch can also be provided with a metal tube which extends the heating action up to the upper punch. The size and the shape of this tubular part can be chosen as a function of the desired temperature ratio.

Concerning said ratio, it can be said that for instance when the thermoplastic material is polyethylene terephthalate, the temperature of the lower punch, bearing-body and plastic can vary from 240° to 280° C, the best value being about 260° C, whereas the upper punch should be between 130° and 150° C, the best being around 140° C.

In the case of acetals, the lower parts temperature can be comprised between 150° and 180° C, the optimum being at 160°, whereas the upper parts should be between 40° and 60° C, the best being 50° C.

It is thus possible to have very fine adjustments of the temperature ratios; this is extremely important where the manufacture of micro-bearing with a total volume of only a few tenth of cubic millimeter is concerned.

We claim:

1. Moulding device for manufacturing bearings usable in the watchmaking industry and for small apparatuses the bushing of which is made of a thermoplastic material directly moulded in the supporting body of the bearing, which comprises a movable first punch on the tip of which is placed a bearing body into which body the first punch tip penetrates, heating means acting on said bearing when installed over said first punch tip and on a piece of thermoplastic material placed upon said bearing-body, and a second punch facing the first punch, located coaxially with respect to said first punch 14 outside of the heating zone of the heating means, means to displace the first punch in such a way that the heated bearing body with its thermoplastic material is moved simultaneously by the displacement of the first punch so that it leaves the heated zone, contacts the second punch so that the thermoplastic material is squeezed and moulded between the two punches and at the same time forced into the inside of the bearing body and is cooled.

2. Device as claimed in claim 1, characterized by the fact that the heating means are arranged so as to work by radiation.

3. Device as claimed in claim 1, characterized by the fact that the heating means are ring shaped and have in their center the upper end of the first punch when said first punch occupies one of the two extreme positions defined by its stroke.

4. Device as claimed in claim 1, characterized by the fact that it comprises means to heat the second punch.

5. Device as claimed in claim 4, characterized by the fact that the heating means of the second punch are arranged in such a way that the temperature of said second punch is kept constant for the full time of the operational cycle.

6. Device as claimed in claim 4, characterized by the fact that the heating means of the second punch are electrical means.

7. Device as claimed in claim 6, characterized by the fact that the said electrical heating means are axially movable along the second punch, so that its action is controllable.

8. Device as claimed in claim 6, characterized by the fact that the said electrical heating means have a modifiable shape so that their heating action on the second punch be adjustable by a change of the distance between said heat means and said second punch.

* * * * *